(12) United States Patent
Wei

(10) Patent No.: US 9,497,002 B2
(45) Date of Patent: Nov. 15, 2016

(54) 3D MIMO CSI FEEDBACK BASED ON VIRTUAL ELEVATION PORTS

(71) Applicant: QUALCOMM INCORPORATED, San Diego, CA (US)

(72) Inventor: Chao Wei, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/764,394

(22) PCT Filed: Feb. 7, 2014

(86) PCT No.: PCT/CN2014/071869
§ 371 (c)(1),
(2) Date: Jul. 29, 2015

(87) PCT Pub. No.: WO2014/117748
PCT Pub. Date: Aug. 7, 2014

(65) Prior Publication Data
US 2016/0028519 A1 Jan. 28, 2016

Related U.S. Application Data

(63) Continuation of application No. PCT/CN2013/071178, filed on Jan. 31, 2013.

(51) Int. Cl.
*H04B 7/02* (2006.01)
*H04L 5/00* (2006.01)
(Continued)

(52) U.S. Cl.
CPC .......... *H04L 5/0048* (2013.01); *H04B 7/0456* (2013.01); *H04B 7/0617* (2013.01);
(Continued)

(58) Field of Classification Search
CPC ................ H04B 7/0456; H04B 7/0617; H04B 7/0639; H04B 7/0632; H04L 5/0048; H04W 88/08
See application file for complete search history.

(56) References Cited

U.S. PATENT DOCUMENTS

2009/0041150 A1 2/2009 Tsai et al.
2013/0120191 A1\* 5/2013 Zhang .................. H04B 7/0469
342/377

(Continued)

FOREIGN PATENT DOCUMENTS

CN 101137185 A 3/2008
CN 101877608 A 11/2010
(Continued)

OTHER PUBLICATIONS

International Search Report and Written Opinion—PCT/CN2013/071178—ISA/EPO—Oct. 31, 2013.
(Continued)

*Primary Examiner* — Syed Haider
(74) *Attorney, Agent, or Firm* — Patterson & Sheridan, L.L.P.

(57) ABSTRACT

Certain aspects of the present disclosure provide techniques for a user equipment (UE) to efficiently provide feedback regarding preferred beams to a base station (BS) that transmits with different beams from different elevations. The techniques generally involve the BS transmitting first reference signals transmitted, using a plurality of elevation beams. The UE selects at least one preferred elevation beam based on the first reference signals and feeds this back to the BS. The BS transmits second reference signals using the preferred elevation beam and a plurality of azimuthal ports. The UE provides a second stage channel feedback to the base station, based on the second reference signals.

28 Claims, 12 Drawing Sheets

(51) Int. Cl.
H04B 7/04 (2006.01)
H04B 7/06 (2006.01)
H04W 88/08 (2009.01)

(52) U.S. Cl.
CPC .......... *H04B 7/0632* (2013.01); *H04B 7/0639* (2013.01); *H04B 7/0695* (2013.01); *H04W 88/08* (2013.01)

(56) References Cited

U.S. PATENT DOCUMENTS

| 2013/0259151 | A1* | 10/2013 | Thomas | H04L 25/03949 375/267 |
| 2014/0016549 | A1* | 1/2014 | Novlan | H04B 7/0417 370/328 |
| 2014/0177683 | A1* | 6/2014 | Krishnamurthy | H04B 7/0469 375/219 |
| 2014/0219375 | A1 | 8/2014 | Zhu et al. | |
| 2015/0207547 | A1* | 7/2015 | Ko | H04B 7/0456 370/252 |
| 2015/0382205 | A1* | 12/2015 | Lee | H04B 7/0417 370/329 |

FOREIGN PATENT DOCUMENTS

| EP | 2482582 A1 | 8/2012 |
| EP | 2528290 A1 | 11/2012 |
| WO | WO-2012063173 A1 | 5/2012 |
| WO | WO-2013000260 A1 | 1/2013 |

OTHER PUBLICATIONS

International Search Report and Written Opinion for PCT/CN2014/071869, dated Apr. 30, 2014.
Alcatel-Lucent Shanghai Bell et al., "Considerations on CSI feedback enhancements for high-priority antenna configurations", 3GPP Draft; R1-112420 Considerations on CSI Feedback Enhancements for High-Priority Antenna Configurations Clean, 3rd Generation Partnership Project (3GPP), Mobile Competence Centre; 650, Route Des Lucioles; F-06921 Sophia-Antipolis Cedex, France, vol. Ran Wg1, No. Athens, Greece; Aug. 22, 2011, Aug. 18, 2011 (Aug. 18, 2011), XP050537814, [retrieved on Aug. 18, 2011].
Supplementary European Search Report—EP14746148—Search Authority—Munich—Sep. 9, 2016.

* cited by examiner

Ports 1, 2, 3, 4, ... 7 and 8 for azimuth PMI derivation
Ports 1, 2, 9, 10, ... 57 and 58 for elevation PMI derivation

3D MIMO CSI FEEDBACK BASED ON VIRTUAL ELEVATION PORTS

CLAIM OF PRIORITY UNDER 35 U.S.C. §119

This application claims benefit of International PCT Application Ser. No. PCT/CN2013/071178, filed Jan. 31, 2013, which is herein incorporated by reference in its entirety.

BACKGROUND

I. Field

Certain aspects of the disclosure generally relate to wireless communications and, more particularly, to techniques for 3D multiple-input multiple-output (MIMO) channel state information (CSI) feedback based on virtual elevation ports.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the disclosure provide techniques for 3D multiple-input multiple-output (MIMO) channel state information (CSI) feedback based on virtual elevation ports.

Certain aspects of the present disclosure provide a method for wireless communications by a user equipment (UE). The method generally includes receiving first reference signals transmitted, using a plurality of elevation beams, from a base station (BS) having a multi-dimensional array of transmit antennas, selecting, based on the first reference signals, at least one preferred elevation beam from the plurality of elevation beams, providing to the base station an indication of the at least one preferred elevation beam, receiving second reference signals transmitted, using the preferred elevation beam and a plurality of azimuthal ports, and providing a second stage channel feedback to the base station, based on the second reference signals.

Certain aspects of the present disclosure provide a method for wireless communications by a BS having a multi-dimensional array of transmit antennas. The method generally includes transmitting first reference signals using a plurality of elevation beams, receiving, from a UE, an indication of at least one preferred elevation beam selected from the plurality of elevation beams, based on the first reference signals, transmitting second reference signals using the preferred elevation beam and a plurality of azimuthal ports, and receiving channel feedback from the UE, based on the second reference signals.

For certain aspects, the plurality of elevation beams comprise a plurality of fixed elevation beams, with each fixed elevation beam mapped to a particular channel state information reference signal (CSI-RS) resource. In aspects, the UE further receives signaling indicating information regarding the mapping.

Certain aspects of the present disclosure provide an apparatus for wireless communications by a user equipment (UE). The apparatus generally includes means for receiving first reference signals transmitted, using a plurality of elevation beams, from a base station having a multi-dimensional array of transmit antennas, means for selecting, based on the first reference signals, at least one preferred elevation beam from the plurality of elevation beams; means for providing to the base station an indication of the at least one preferred elevation beam, means for receiving second reference signals transmitted, using the preferred elevation beam and a plurality of azimuthal ports, and means for providing a second stage channel feedback to the base station, based on the second reference signals.

Certain aspects of the present disclosure provide an apparatus for wireless communications by a user equipment (UE). The apparatus generally includes at least one processor configured to receive first reference signals transmitted, using a plurality of elevation beams, from a base station having a multi-dimensional array of transmit antennas, select, based on the first reference signals, at least one preferred elevation beam from the plurality of elevation beams, provide to the base station an indication of the at least one preferred elevation beam, receive second reference signals transmitted, using the preferred elevation beam and a plurality of azimuthal ports, and providing a second stage channel feedback to the base station, based on the second reference signals. The apparatus generally also includes a memory coupled with the at least one processor.

Certain aspects of the present disclosure provide a program product for wireless communications by a user equipment (UE). The program product generally includes a computer-readable medium having instructions stored thereon, the instructions executable by one or more processors for receiving first reference signals transmitted, using a plurality of elevation beams, from a base station having a multi-dimensional array of transmit antennas, selecting, based on the first reference signals, at least one preferred elevation beam from the plurality of elevation beams, providing to the base station an indication of the at least one preferred elevation beam, receiving second reference signals transmitted, using the preferred elevation beam and a plurality of azimuthal ports, and providing a second stage channel feedback to the base station, based on the second reference signals.

Aspects of the present disclosure also include various apparatus and program products for performing operations in accordance with the methods described above.

DETAILED DESCRIPTION

Certain aspects of the disclosure provide techniques for 3D multiple-input multiple-output (MIMO) channel state information (CSI) feedback based on virtual elevation ports. According to certain aspects, a UE receives first reference signals (RS) from a base station that has a multi-dimensional array of transmit antennas. The RSs are transmitted from the BS using a plurality of elevation beams and the UE can select a preferred elevation beam and provide an indication of the preferred elevation beam to the base station. The UE subsequently receives RSs from the BS that uses the preferred elevation beam and a plurality of azimuthal ports. The UE then provides channel feedback to the BS based on the RSs that were sent using the preferred elevation beam.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below.

An Example Wireless Communications Network

Figure 1:
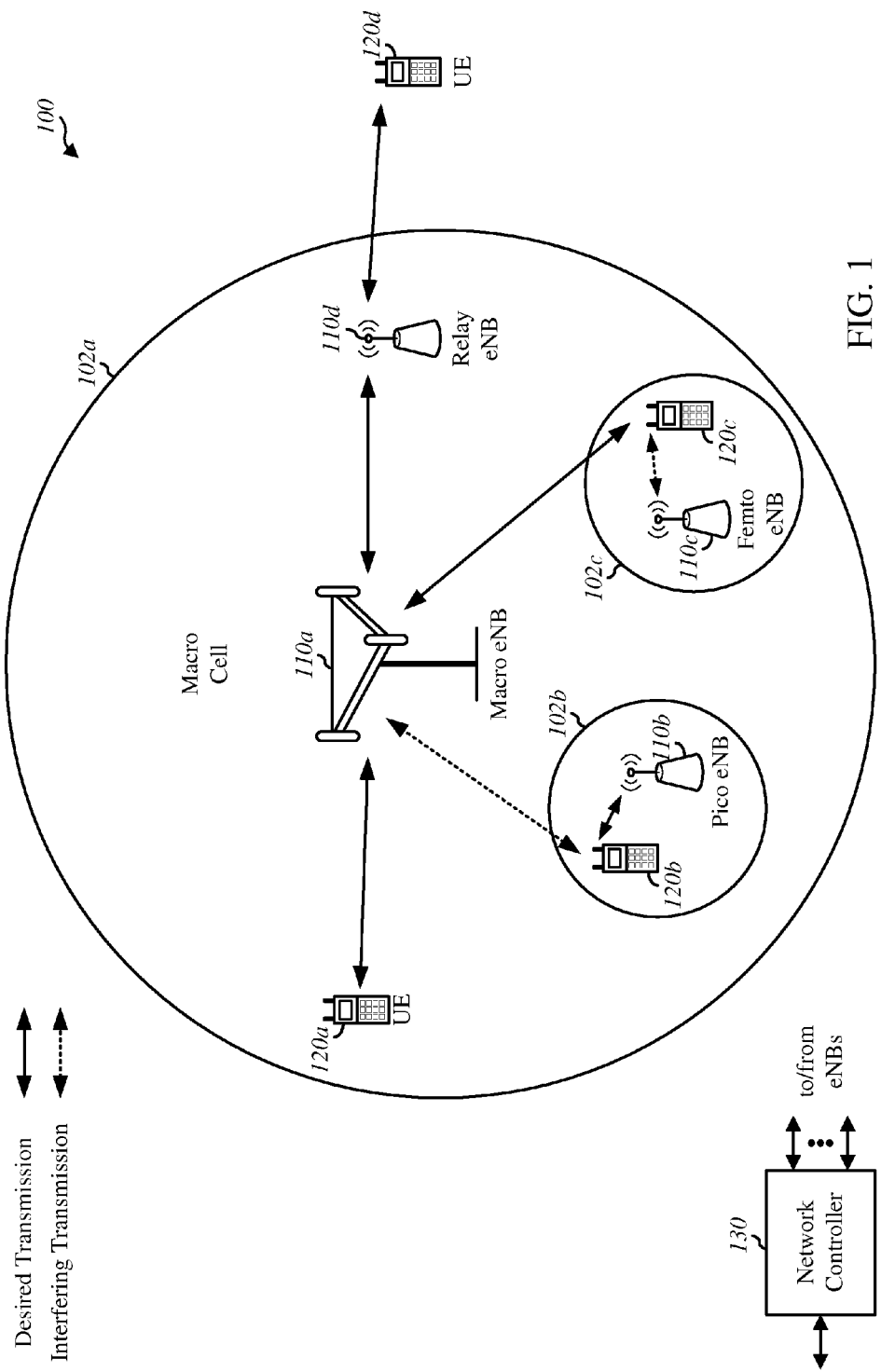
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
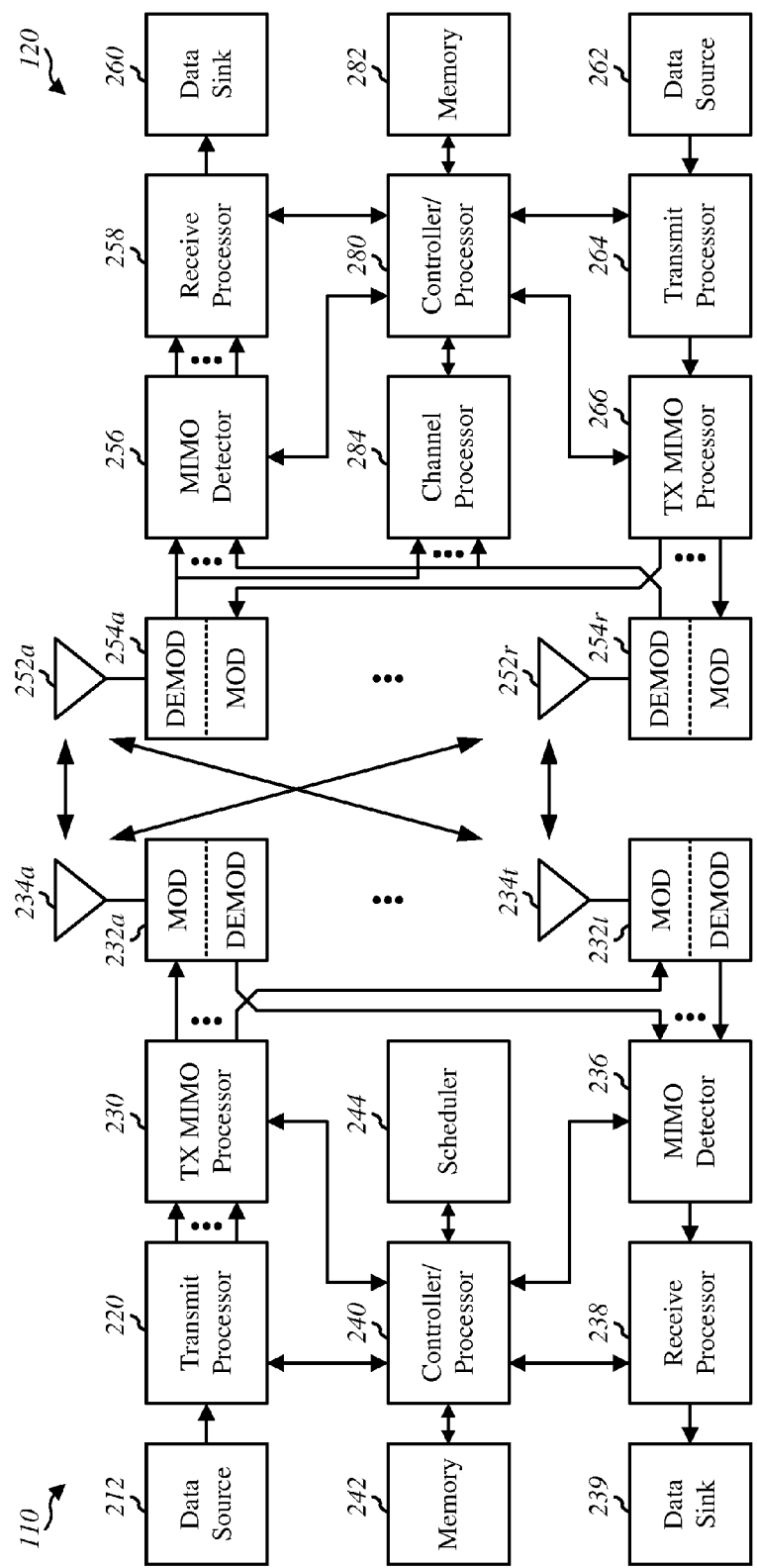
FIG. 2 is a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols using the PMI (Precoding Matrix Indicator) feedback from the UE, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
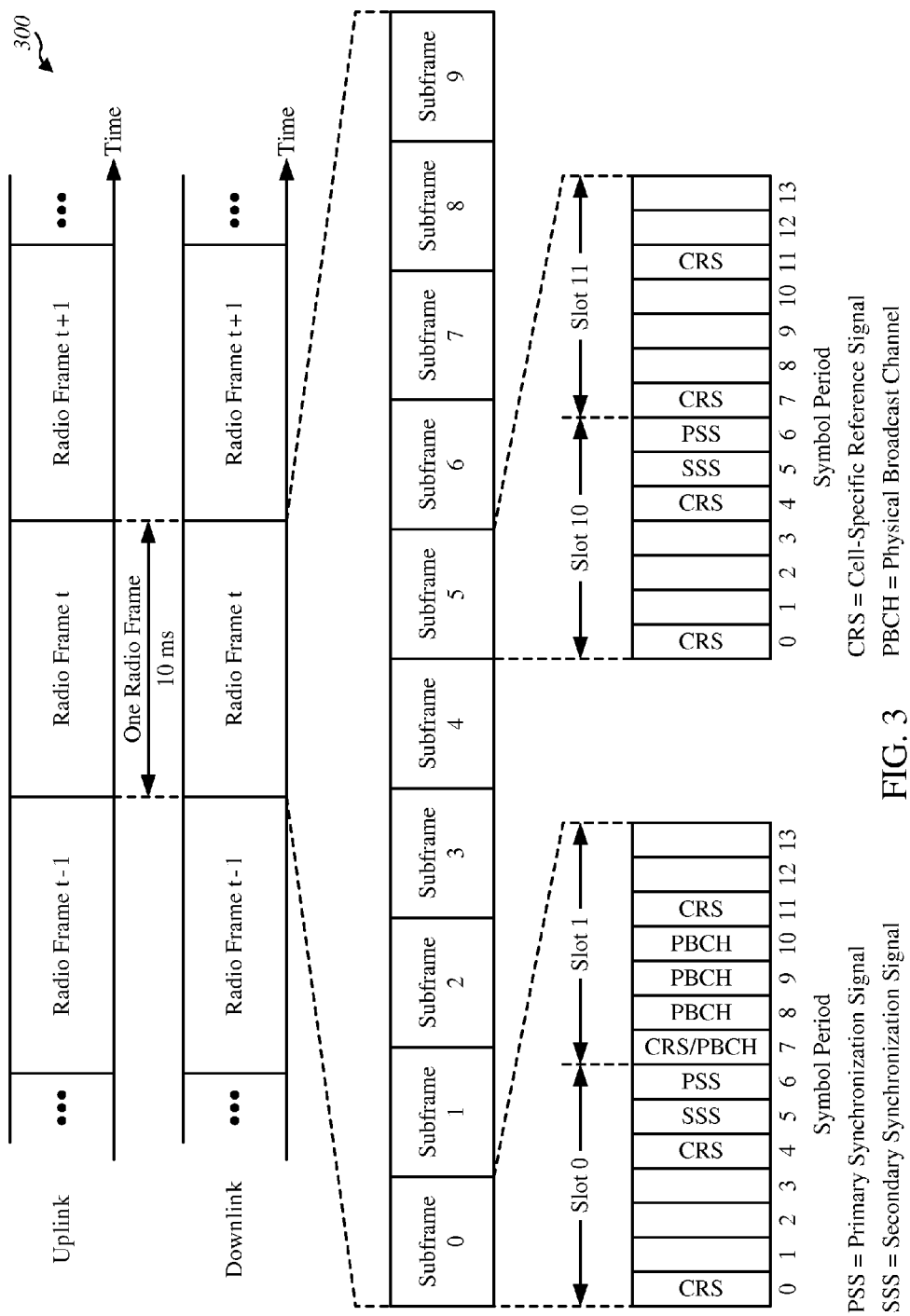
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
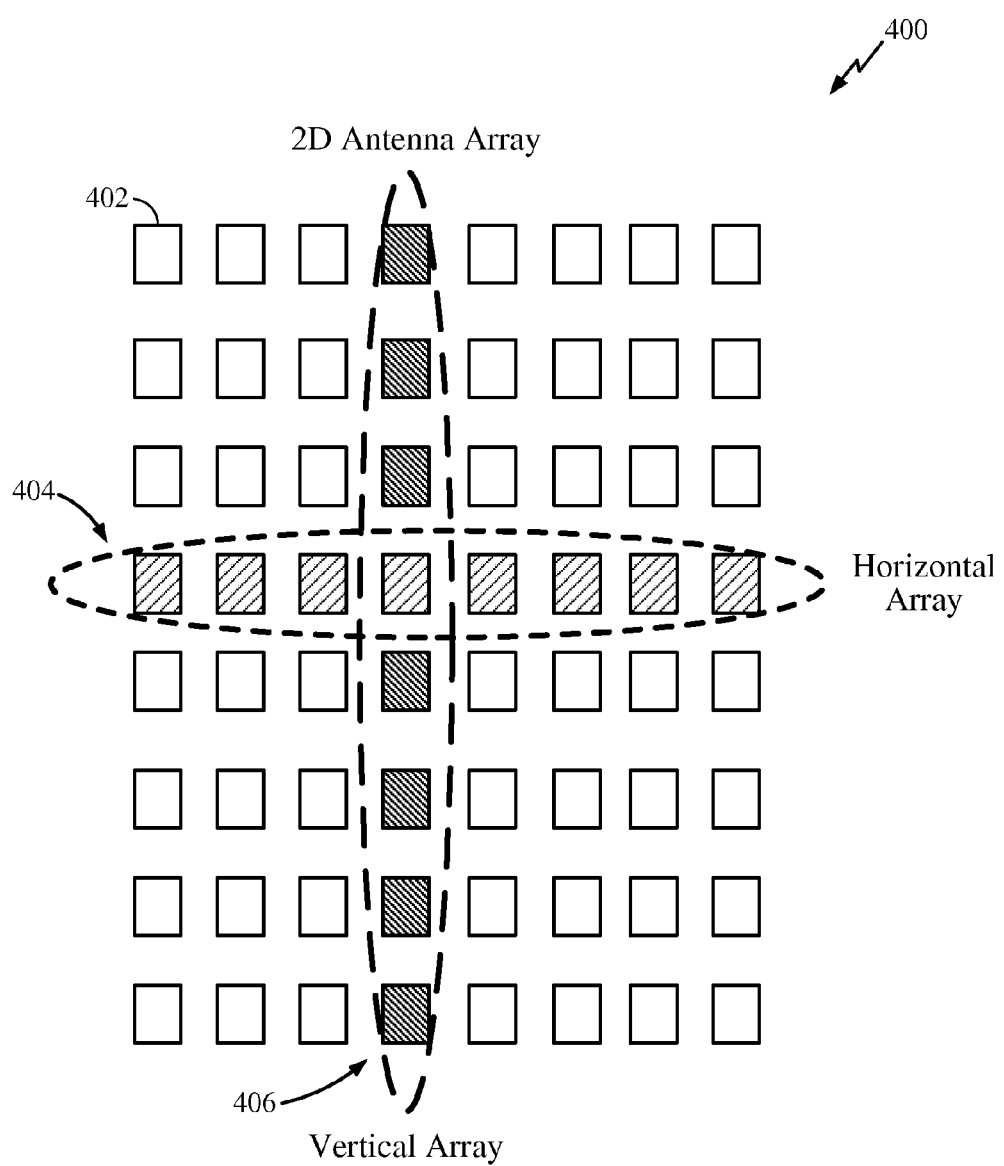
FIG. 4 illustrates an example of an antenna array that may be used for high dimension multiple-input multiple-out (MIMO) communications, in accordance with certain aspects of the present disclosure.

In certain systems, higher dimension 3D MIMO (as well as "lower dimension" 2D MIMO) systems have been discussed to enhance the peak data rate. As an example, in a 2D antenna array system with 64 antennas, it is possible to deploy a grid of 8×8 antennas on a 2D plane, as shown in FIG. 4. In this case, horizontal beamforming as well as vertical beamforming may used to exploit beamforming/SDMA gain both in azimuth and elevation. 8 antennas at the eNB, deployed in azimuth dimension only, allows SDMA or SU-MIMO in horizontal direction. Further inclusion of antennas in elevation, however, allows beamforming also in the vertical plane (e.g. to support different floors in a high rise building.

To reduce the overhead and complexity associated with RS, as well as feedback and precoding matrix selection, antenna port to virtual beam mapping to reduce the required RS ports may be utilized (e.g., to convert from N antennas to K virtual beams).

Figure 5:
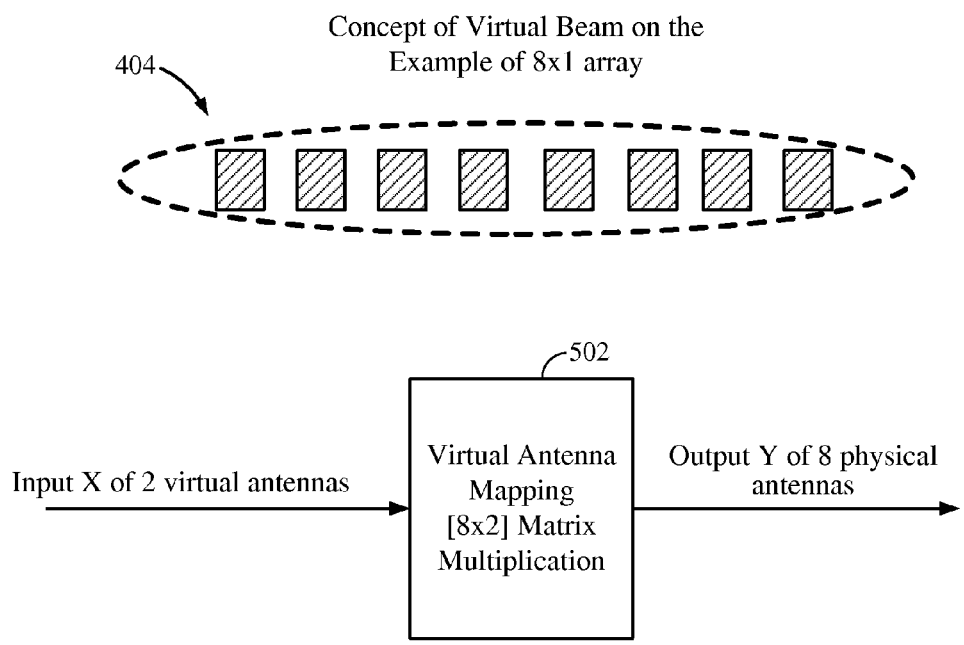
FIG. 5 illustrates an example virtual antenna mapping, in accordance with certain aspects of the present disclosure.

As illustrated in FIG. 5, the mapping from antenna ports to virtual beam may periodically change to beamform in different directions in both azimuth and elevation. This approach may allow better granularity in beamforming directions over time. An eNB may signal the periodicity of such update to UE. The CSI reporting may be mapped to the periodicity of the beam scanning periodicity. At any time, the UE monitors K virtual beams and report CSI based on K virtual beams.

The number of virtual beams and update periodicity may be adaptively configured by the eNB and signalled to UE in RRC signalling. This can also be done in a UE transparent manner as described below.

3D MIMO CSI Feedback Based on Virtual Elevation Beams

Three dimensional (3D) multiple-input multiple-output (MIMO) and elevation beamforming can improve system capacity by using a two-dimensional (2D) antenna array with a relatively large number of antennas at the eNode B (eNB). 3D-MIMO and elevation beamforming have relatively small intra-cell interference and relatively high beamforming gain. However, one issue with 3D-MIMO and elevation beamforming is how to perform channel state information (CSI) measurement and feedback. For example, assuming a total of E×A available ports (e.g., A azimuth ports per elevation port and total E elevation ports), the UE may provide phasing weight feedback on each of the E×A ports in time and frequency for each rank.

Figure 6:
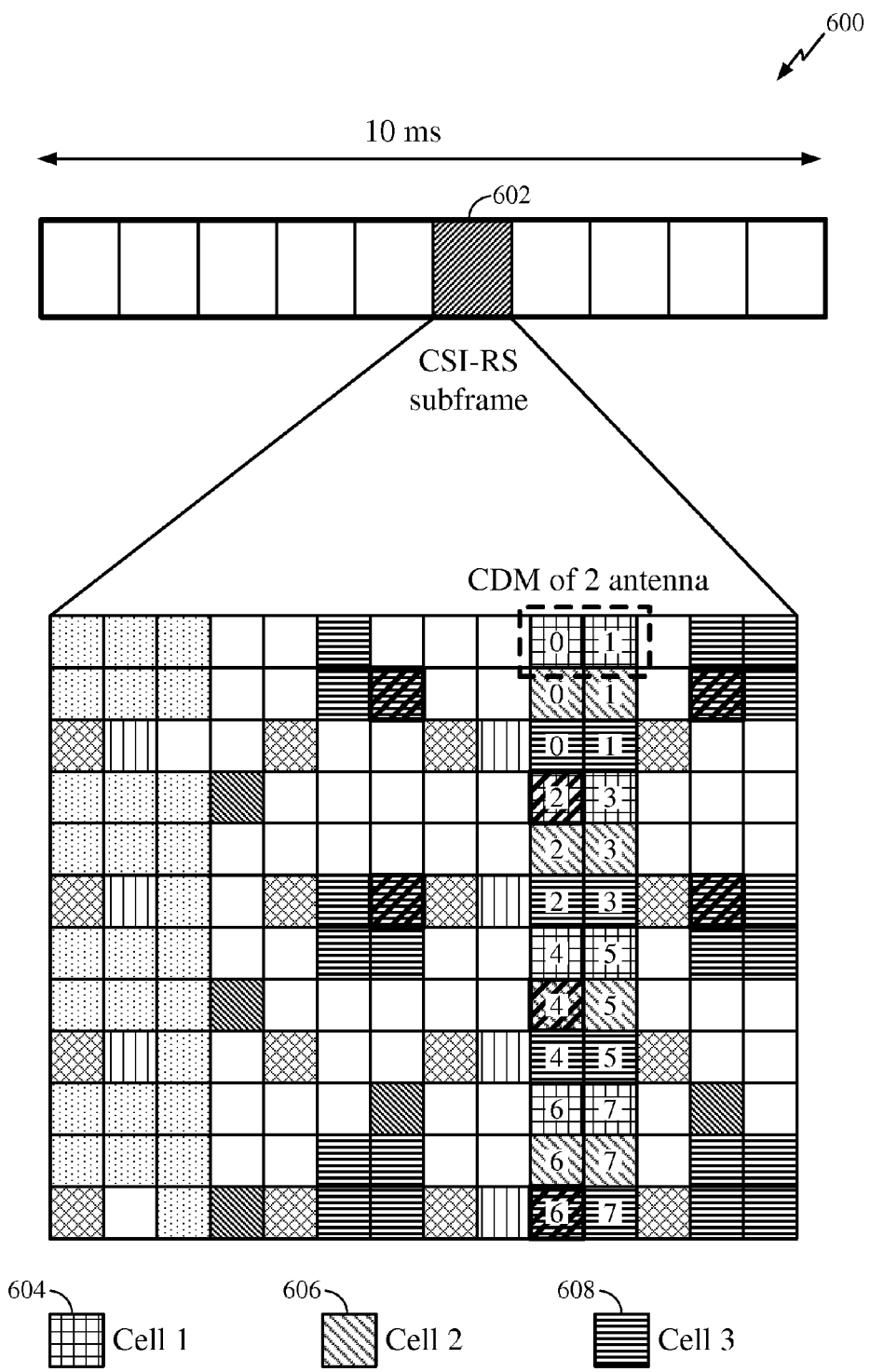
FIG. 6 illustrates an example of channel state information reference signal (CSI-RS) resource allocation, in accordance with certain aspects of the present disclosure.

FIG. 6 illustrates an example allocation 600 of CSI reference signal (CSI-RS) resources 602 for LTE. The eNB may transmit low duty-cycle reference signals (e.g., CSI-RS) to a particular UE for downlink CSI measurement. According to certain aspects, CSI-RS can support up to eight antenna ports and may be transmitted in a wideband manner. In aspects, depending on the number of CSI-RS antenna ports there may be multiple reuse patterns on different locations allowing different cells (e.g., Cell 1 604, Cell 2 606, Cell 3 608) to utilize different patterns to avoid mutual CSI-RS collision. In aspects, the CSI-RS may be transmitted only once on every 5, 10, 20, 40 or 80 ms.

The low overhead may also be achieved by allocating a single resource element (RE), per resource block (RB), per CSI-RS antenna port, except when the CSI-RS has only one antenna port, in which case two REs are allocated per RB. In some cases, for 3D MIMO is considered, particular elevation beams may be mapped to particular CSI-RS resources.

Figure 7:
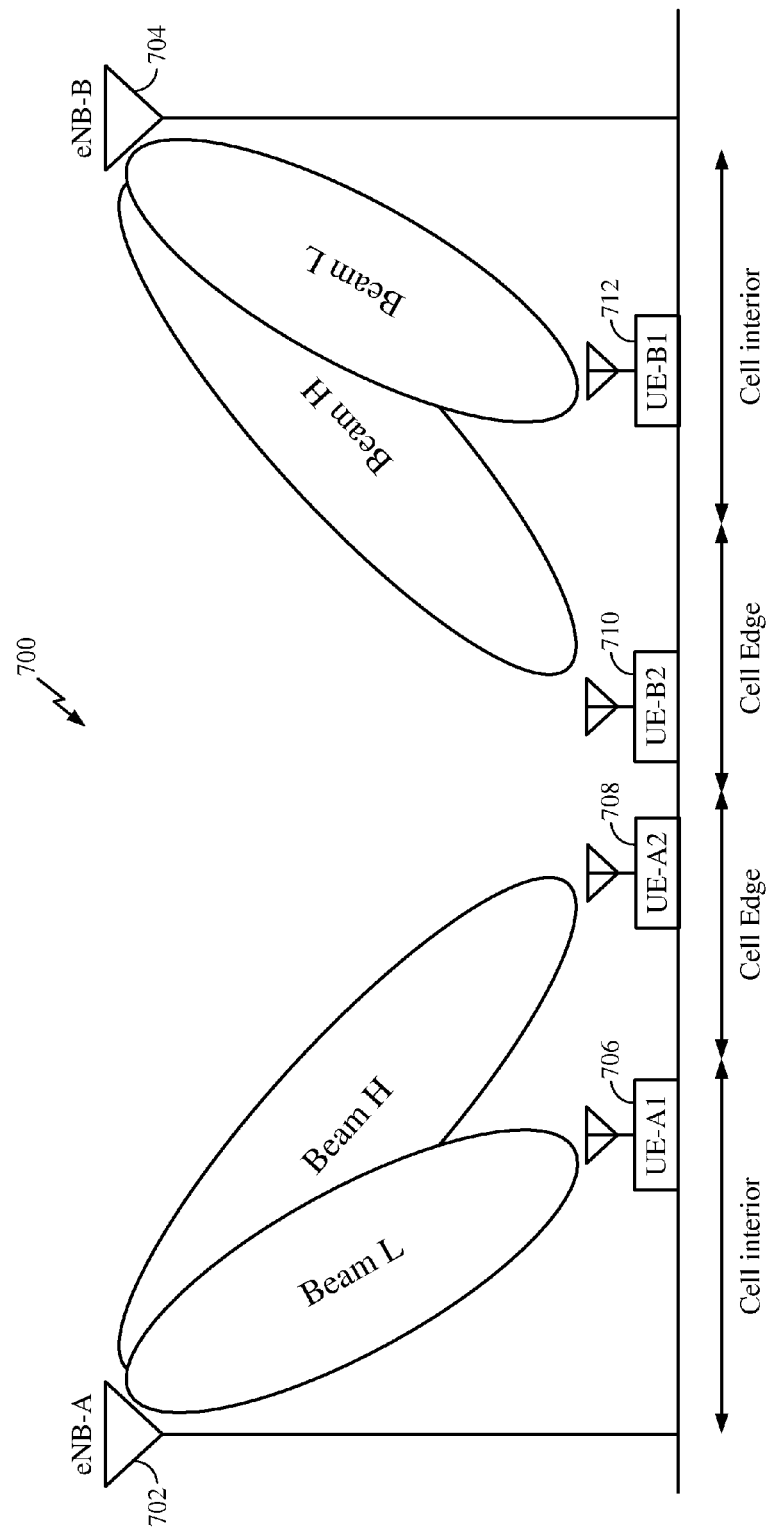
FIG. 7 is a block diagram conceptually illustrating an example wireless communication network applying elevation beamforming with 2D antenna array, in accordance with certain aspects of the present disclosure.

FIG. 7 is a block diagram conceptually illustrating an example of a wireless communication network 700 applying elevation beamforming with 2D antenna array, in accordance with certain aspects of the present disclosure. Applying elevation beamforming with 2D antenna array may create two vertical sectors, rather than one azimuth sector. As shown in FIG. 7, a UE-A1 706 may be located at the interior of eNB A 702 and UE-A2 708 may be located at the cell edge of eNB A 702. A UE-B1 712 may be located at the interior of eNB B 704 and a UE-B2 710 may be located at the cell edge of eNB B 704. Beam L may be used for the UEs located in the interior of the cells and Beam H may be used for the UEs at the cell edges.

According to certain aspects, in LTE, implicit feedback of channel information may be used, for example, based on a predefined codebook set. The codebook set size may be proportional to the number of antennas. In aspects, when the number of antenna ports exceeds eight ports, the size of the codebook set used becomes huge. For example, assuming rank 1 transmission, for two antenna ports, the codebook set size is 4. For four antenna ports, the codebook set size is 16. And for eight antenna ports, the codebook set size is 32. Also, compared to azimuth angles, elevation angles are typically between 93 degrees and 109 degrees (i.e., a range of 16 degrees) for an urban macro cell.

Therefore, simplified UE measurement and efficient codebook design for 3D MIMO and elevation beamforming are desirable.

Figure 8:
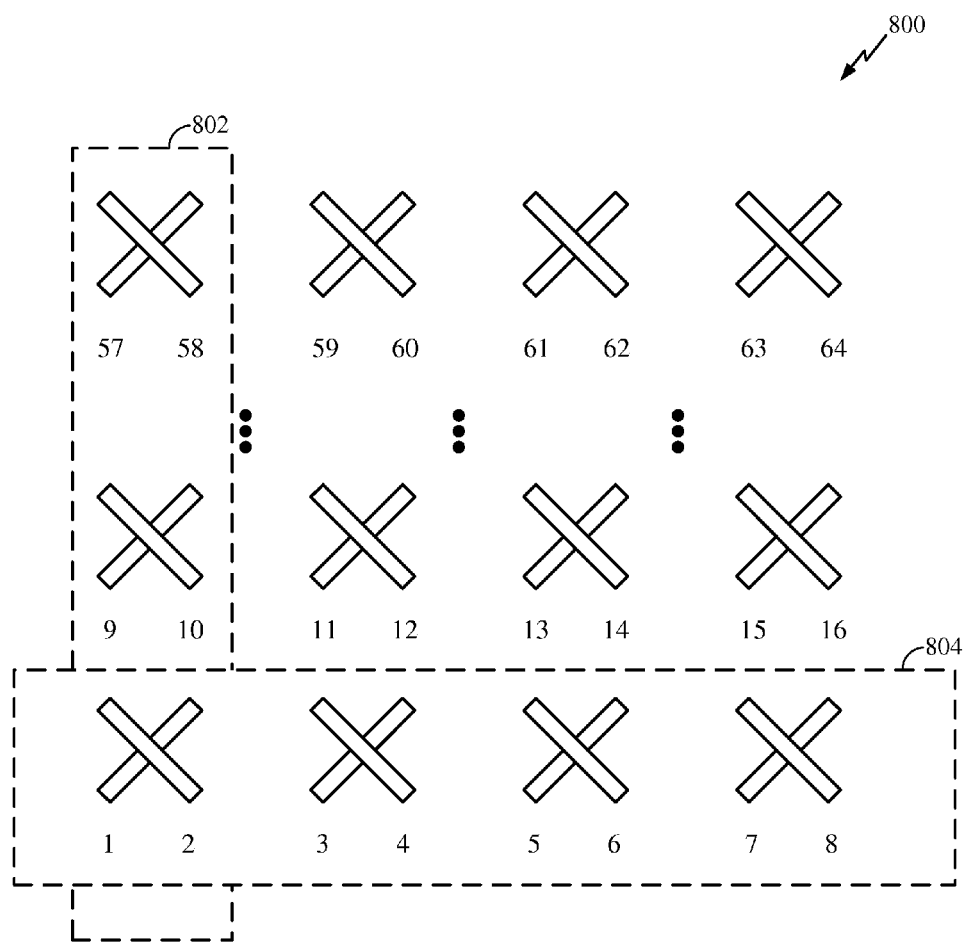
FIG. 8 illustrates example feedback with azimuth-oriented and elevation-oriented pre-coding matrix indicator (PMI), in accordance with certain aspects of the present disclosure.

FIG. 8 illustrates a product structure codebook 800, in accordance with certain aspects of the present disclosure. According to certain aspects, the precoding matrix index (PMI) may be separated into azimuth-only and elevation-only. Using this approach, the feedback for the E×A ports may be downgraded to E-port feedback 804 and A-port feedback 802. The UE may separate feedback azimuth-oriented and elevation-oriented PMI and the eNB may combine the two PMIs feedback to form E×A antenna ports precoding weights.

Assuming E×1 CB is [V1, V2 ... VE] and A×1 CB is [VA], then EA×1 CB is [V1VA, V2VA, ... VEVA]. As seen in FIG. 8, ports 1-8 are used for azimuth PMI derivation and ports 1, 2, 9, 10, ..., 57, and 58 are used for elevation PMI derivation. One CSI Reference Signal (CSI-RS) resource with A ports is used for azimuth-oriented PMI measurement.

In aspects, the CSI-RS resource with A ports is transmitted with elevation antenna aggregation such as cell specific elevation downtilt.

Similarly, another CSI-RS resource with E ports may be transmitted with cell-specific azimuth antenna aggregation for elevation-oriented PMI measurement. According to certain aspects, the UE may measure and derive the azimuth and elevation PMIs from the two CSI-RS resources. The elevation PMI may be derived by co-phasing each azimuth stream in the elevation dimension. The aggregated CQI of the two CSI-RS resources are computed and fed back with the assumption of using E×A antennas for transmission.

Using a product structure codebook design for 3D-MIMO may have drawbacks. A cell specific antenna aggregation for CSI measurement may result in a different channel from data transmission where UE specific antenna aggregation is applied. In the product structure codebook design, elevation PMI may be used to co-phase each azimuth stream in elevation dimension based on the assumption that the elevation and azimuth angles are independent and the row of antennas are highly correlated to each other. This may not be valid when elevation angular spread is large. Finally, the product structure codebook design may not support rank >1 transmission on both elevation and azimuth.

Techniques and apparatus are presented herein for CSI feedback for 3D MIMO by utilizing virtual elevation beam.

Figure 9:
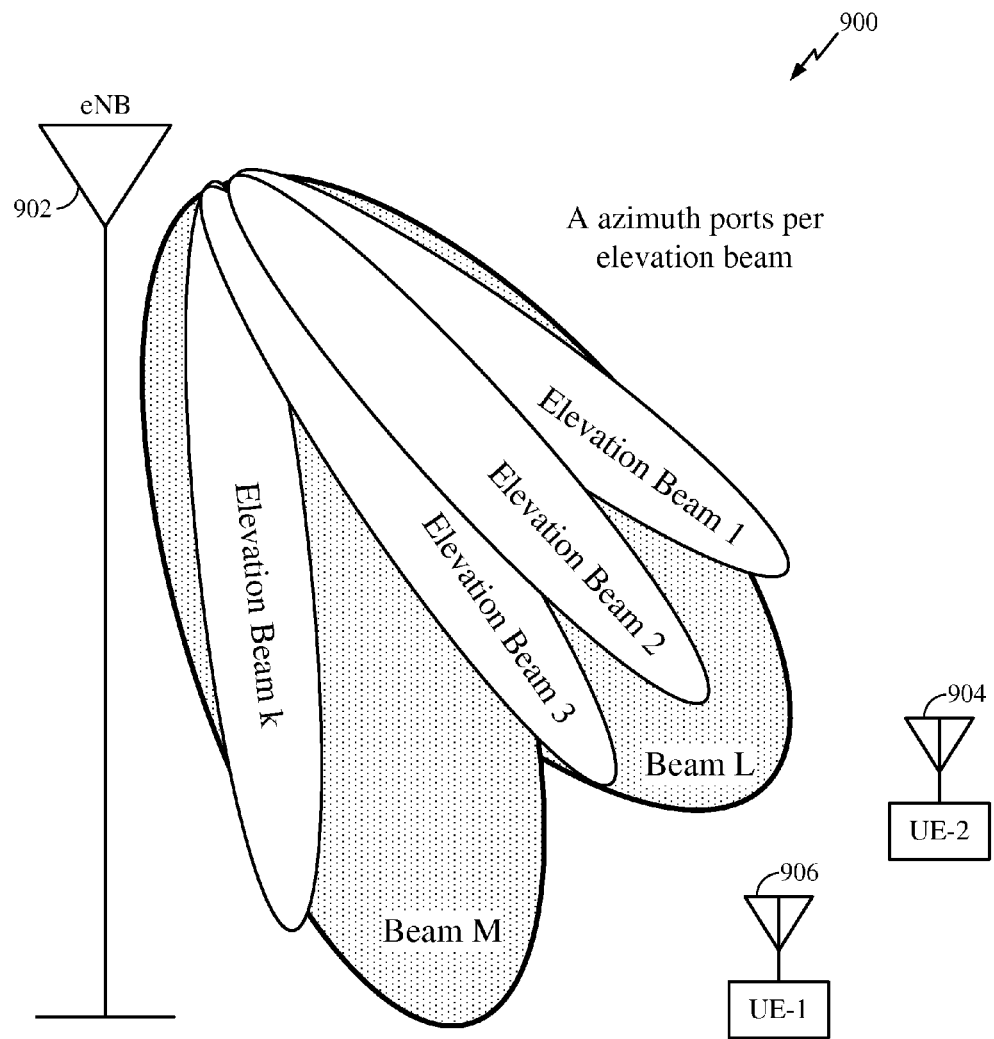
FIG. 9 illustrates example virtual antenna mapping, in accordance with certain aspects of the present disclosure.

FIG. 9 illustrates example virtual elevation beam mapping 900, in accordance with certain aspects of the present disclosure. As seen in FIG. 9, eNB 902 may use elevation beams k, 1, 2, and 3 mapped to virtual elevation beams L and M for UE1 906 and UE2 904. A virtual vertical beam indicates one possible elevation antenna aggregation method or vertical beam pattern constructed from different elevation aggregation weights. The total number of virtual beams may be equal to the size of the elevation codebook set or the set of precoding weights. The virtual beam feedback combined with a second stage azimuth PMI/CQI feedback may consist of 3D-MIMO CSI feedback. In general, the UE is not aware of elevation antenna ports but only the number of virtual elevation beams.

Figure 10:
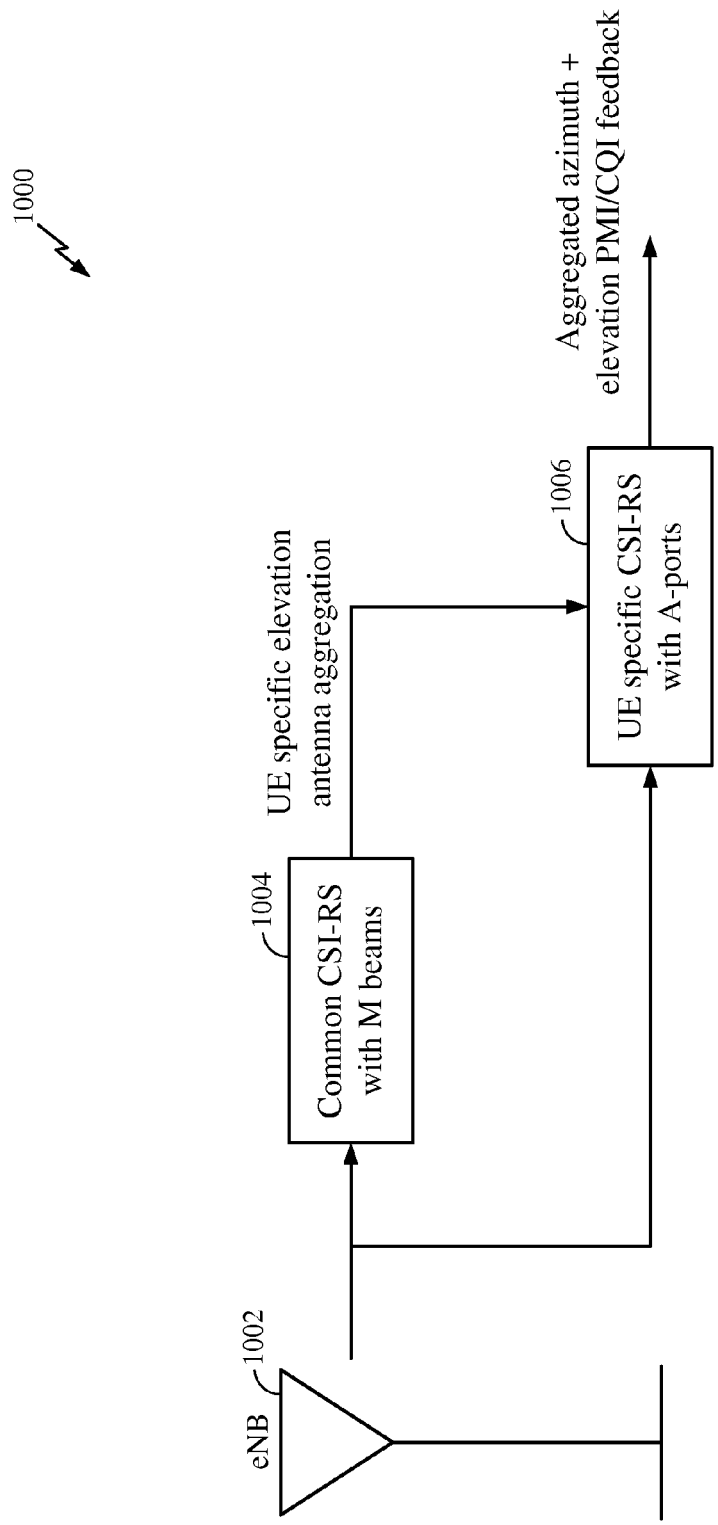
FIG. 10 is a block diagram conceptually illustrating an example implementation of multi-stage CSI feedback for 3D-MIMO using virtual vertical beam, in accordance with certain aspects of the present disclosure.

FIG. 10 is a block diagram 1000 conceptually illustrating an example implementation of virtual elevation beam mapping and 3D MIMO CSI feedback mechanism, in accordance with certain aspects of the present disclosure. As seen in FIG. 10, at 1004, the eNB 1002 may form a number of virtual elevation beams by using all the possible elevation aggregation weights. At 1006, the UE may measure the formed virtual beams on a common CSI-RS resource and feed back the index of the preferred virtual elevation beam to the eNB 1002. Then the eNB 1002 may then transmit a UE specific elevation antenna aggregation on the UE dedicated CSI-RS resource based on the feedback elevation beam index for a the second stage azimuth PMI/CQI measurement. In aspects, the UE may feedback multiple elevation beam indicators for elevation MIMO purposes.

According to certain aspects, there is fixed mapping between multiple elevation beams and the CSI-RS resources for the second stage azimuth PMI/CQI measurement. For example, depending on the cell size, a few fixed vertical beams can be determined, and mapped to different CSI-RS resources (e.g., each CSI-RS resource may be beamshaped by one specific elevation antenna aggregation). This information can be broadcasted in system information block (SIB) instead of UE-specific radio resource control (RRC) signaling. In aspects, based on the common CRS-RS measurement, the UE may choose one or multiple CSI-RS resources that are corresponding to the UE preferred vertical beams to feedback the 3D-MIMO CQI/PMI.

According to certain aspects, with UE specific elevation antenna aggregation based on the feedback, E×A ports may be aggregated to A ports and, thus, existing 2D MIMO PMI feedback methods may be used for the second stage azimuth PMI/CQI feedback. For example, assuming the number of azimuth ports is limited to eight, the existing codebook set of LTE may be used for the second stage azimuth PMI feedback. In aspects, vertical beams may be overlapped (i.e., eigen-space domain) or non-overlapped (i.e., angle domain).

According to certain aspects, the UE may also feed back the measured CQI on the dedicated CSI-RS resource. Since the dedicated CSI-RS resource is transmitted with UE specific elevation antenna aggregation, the feedback CQI may be a type of aggregated CQI, which is different from CQI measured on azimuth-only or elevation-only, as for the product structure codebook PMI method.

In order to further reduce virtual beam feedback overload, the hierarchical feedback method may also be used. For the hierarchical feedback method, M total virtual elevation beams formed from E ports may be classified into K groups, each with L beams. In aspects, the beams in different groups may be orthogonal or quasi-orthogonal. For example, 16 beams from 8 elevation ports may be divided into 8 groups: {0,1,2,3}, {2,3,4,5}, {4,5,6,7}, . . . , {13,14,15,16}, {15,16, 0,1}.

According to certain aspects, the configuration of the common CSI-RS resource for elevation beam measurement may use the existing CSI-RS configuration, as in the current 2D MIMO framework (e.g., AntennaPortsCount, Resource-Config, and SubframeConfig, etc.). For the common CSI-RS resource, the number of antenna ports for measurement may be equal to the number of vertical beam groups. Only one beam in each group may be transmitted in each PRB. In aspects, the beams in each group may be cyclic shifted and transmitted on the frequency domain over multiple PRBs and/or on the time domain over each symbol occurrence. By measuring the common CSI-RS the UE determines the preferred elevation beam pattern.

According to certain aspects, the common CSI-RS resource is configured for all elevation aware UEs. In aspects, for legacy UEs, the eNB may apply cell level elevation antenna aggregation for dedicated CSI-RS transmission.

In aspects, the algorithm to derive the vertical beam may be, for example, based on received signal strength. The UE may feedback the selected best and worst group index as well as the beam offset in the best group to the eNB. For fast adaptation, the feedback rate for beam group and offset can be different (e.g., a relatively slower rate for the group index). The UE may feed back multiple best elevation beam groups for multi-stream data transmission in elevation when elevation angular spread is large. For example, two vertical beam groups 101 and 181 maybe fed back and two dedicated CSI-RS resources may thus be configured, each corresponding to one elevation beam. In such case the second stage azimuth PMI/CQI is determined from two dedidated CSI-RS resources.

In aspects, the UE may also feedback worst interfering beam group to assist the eNB for multiple-user MIMO (MU-MIMO) on elevation domain and multi-user interference mitigation.

Figure 11:
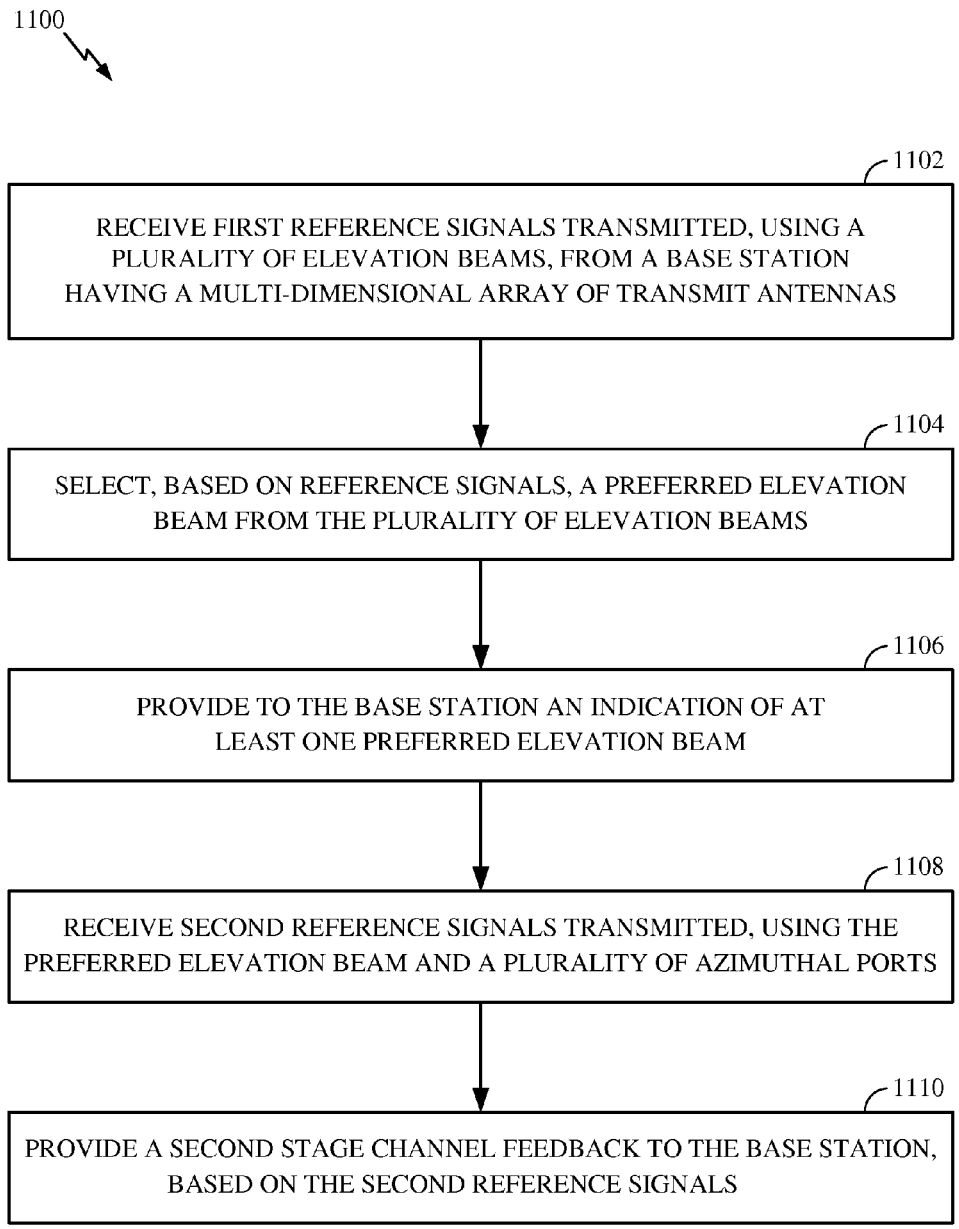
FIG. 11 illustrates example operations that may be performed by a UE, in accordance with certain aspects of the present disclosure.

FIG. 11 illustrates example operations 1100 for wireless communications, in accordance with certain aspects of the present disclosure. The operations 1100 may be performed, for example, by a UE (e.g., UE 120). The operations 1100 may begin, at 1102, by receiving first reference signals transmitted, using a plurality of elevation beams, from a base station having a multi-dimensional array of transmit antennas.

At 1104, the UE may select, based on the first reference signals, at least one preferred elevation beam from the plurality of elevation beams. According to certain aspects, each elevation beam maybe generated as an aggregation of entries of an elevation precoding vector.

At 1106, the UE may provide to the base station an indication of the at least one preferred elevation beam (for example an indication of a group index of elevation beams and an offset in the group, wherein feedback regarding a group is provided less frequently than feedback regarding an offset within the group). In aspects, the UE feeds back at least two preferred elevation beams, for example, when elevation angular spread is above a threshold value as determined based on the first reference signals.

At 1108, the UE may receive second reference signals (e.g., UE-specific channel state information reference signal (CSI-RS) resources for each preferred elevation beam) transmitted, using the preferred elevation beam and a plurality of azimuthal ports.

According to certain aspects, the first reference signals are transmitted using common channel state information reference signal (CSI-RS) resources and the second reference signals are transmitted using UE-specific CSI-RS resources.

At 1110, the UE may provide a second stage channel feedback (e.g., CQI and PMI) to the base station, based on the second reference signals. According to certain aspects, the channel feedback comprises at least one of a channel quality indicator (CQI) and a precoding matrix indicator (PMI).

According to certain aspects, the UE may receive signaling indicating information regarding the mapping. The UE may also provide to the base station an indication of at least one non-preferred interfering elevation beam or group index of elevation beams.

Figure 12:
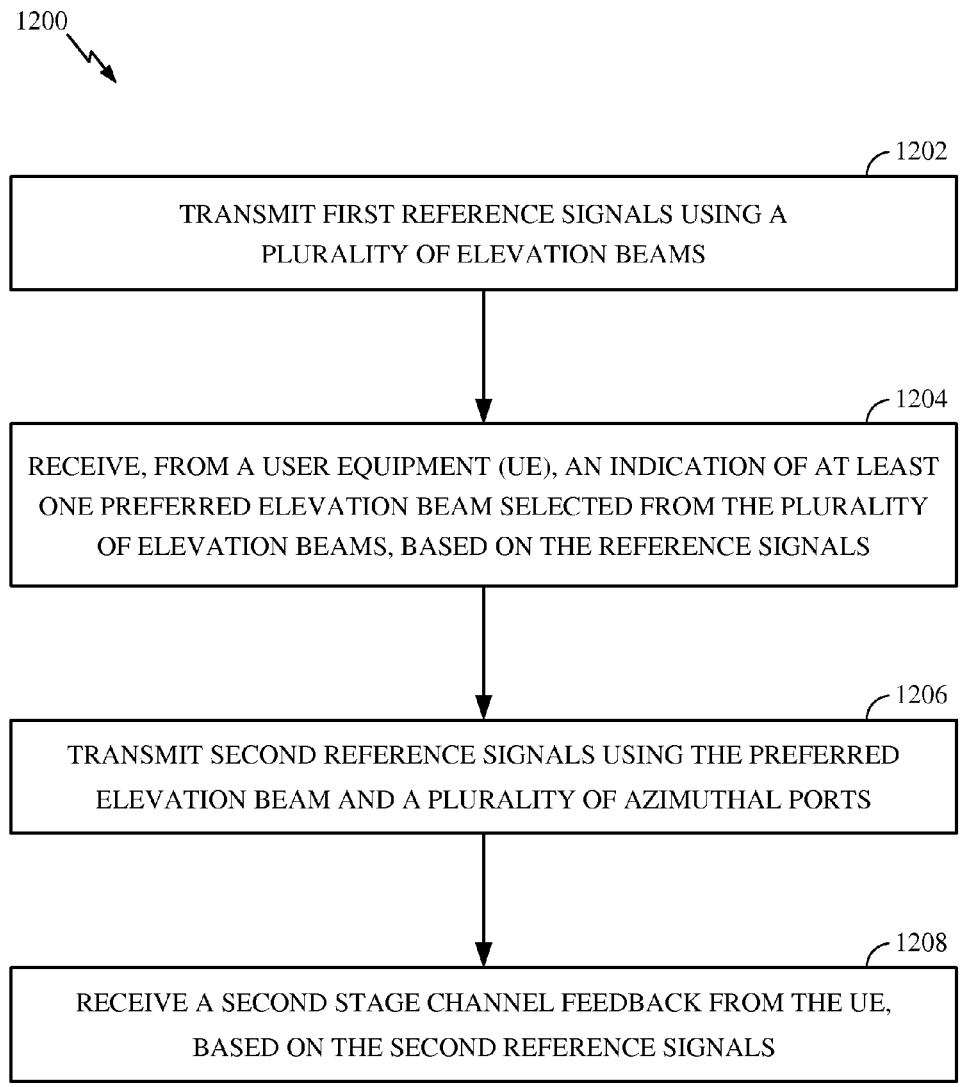
FIG. 12 illustrates example operations that may be performed by a base station, in accordance with certain aspects of the present disclosure.

FIG. 12 illustrates example operations 1200 for wireless communications, in accordance with certain aspects of the present disclosure. The operations 1200 may be performed, for example, by a base station having a multi-dimensional array of transmit antennas (e.g., BS 110). The operations 1200 may begin, at 1202, by transmitting first reference signals using a plurality of elevation beams. For example, the BS may classify elevation beams into groups of beams and transmit only one beam from each group per resource block. Beams in each group may be cyclically shifted transmitted over time symbol and frequency resource blocks.

At 1204, the BS may receive, from a user equipment (UE), an indication of at least one preferred elevation beam (e.g., at least two preferred elevation beams, for example, when elevation angular spread is above a threshold value as determined based on the first reference signals) selected from the plurality of elevation beams, based on the first reference signals. For example, the BS may transmit an indication of a group index of elevation beams and an offset in the group. Feedback regarding a group may be received less frequently than feedback regarding the offset.

At 1206, the BS may transmit second reference signals (e.g., UE-specific CSI-RS resources for each preferred elevation beam) using the preferred elevation beam and a plurality of azimuthal ports. According to certain aspects, the first reference signals are transmitted using common channel state information reference signal (CSI-RS) resources and the second reference signals are transmitted using UE-specific CSI-RS resources.

In aspects, the common CSI-RS resources are configured for elevation aware UEs and the base station applies cell level elevation antenna aggregation for UE-specific CSI-RS transmissions for non-elevation aware UEs.

At 1208, the BS may receive a second stage channel feedback (e.g., CQI and azimuthal PMI of the preferred elevation beam) from the UE, based on the second reference signals.

In aspects, virtual elevation beams may be formed by mapping antenna ports in an elevation dimension to a number of virtual beams. Each elevation beam may be generated as an aggregation of entries of an elevation precoding vector.

According to certain aspects, the BS may transmit signaling indicating information regarding the mapping. In aspects, the BS also receive, from the UE, an indication of at least one non-preferred interfering elevation beam or group index of elevation beams.

Defining a common CSI-RS for elevation aware UEs to measure and feedback elevation antenna aggregation and common CSI-RS mapping E-ports to M elevation beams may allow for low CSI feedback overhead compared to full channel feedback, may use less UE dedicated CSI-RS resources for channel measurement, may support MIMO in elevation with rank up to E×A, and may be backward compatible with legacy UEs.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   receiving first reference signals transmitted, using a plurality of elevation beams, from a base station having a multi-dimensional array of transmit antennas;
   selecting, based on the first reference signals, at least one preferred elevation beam from the plurality of elevation beams;
   providing to the base station an indication of the at least one preferred elevation beam, wherein providing to the base station an indication of at least one preferred elevation beam comprises providing an indication of a group index of elevation beams and an offset in the group index;
   receiving second reference signals transmitted, using the at least one preferred elevation beam and a plurality of azimuthal ports; and
   providing a second stage channel feedback to the base station, based on the second reference signals.

2. The method of claim 1, wherein the channel feedback comprises at least one of a channel quality indicator (CQI) and a precoding matrix indicator (PMI).

3. The method of claim 2, wherein the PMI comprises an azimuthal PMI of the at least one preferred elevation beam.

4. The method of claim 1, wherein the elevation beams are formed by mapping antenna ports in an elevation dimension to a number of virtual beams.

5. The method of claim 4, wherein each elevation beam is generated as an aggregation of entries of an elevation precoding vector.

6. The method of claim 1, wherein the UE feeds back at least two preferred elevation beams.

7. The method of claim 6, wherein the UE feeds back at least two preferred elevation beams when elevation angular spread is above a threshold value as determined based on the first reference signals.

8. The method of claim 6, wherein the second reference signals comprise UE-specific channel state information reference signal (CSI-RS) resources for each preferred elevation beam.

9. The method of claim 1, wherein:
   the first reference signals are transmitted using common channel state information reference signal (CSI-RS) resources;
   the second reference signals are transmitted using UE-specific CSI-RS resources; and
   the second stage channel feedback is based on a measurement of at least two of the UE-specific CSI-RS resources.

10. The method of claim 1, wherein the plurality of elevation beams comprise a plurality of fixed elevation beams, with each fixed elevation beam mapped to a particular channel state information reference signal (CSI-RS) resource.

11. The method of claim 10, further comprising receiving signaling indicating information regarding the mapping.

12. The method of claim 1, wherein feedback regarding a group is provided less frequently than feedback regarding the offset.

13. The method of claim 1, further comprising:
   providing to the base station an indication of at least one non-preferred interfering elevation beam or group index of elevation beams.

14. An apparatus for wireless communications by a user equipment (UE), comprising:
   means for receiving first reference signals transmitted, using a plurality of elevation beams, from a base station having a multi-dimensional array of transmit antennas;
   means for selecting, based on the first reference signals, at least one preferred elevation beam from the plurality of elevation beams;

means for providing to the base station an indication of the at least one preferred elevation beam, wherein providing to the base station an indication of at least one preferred elevation beam comprises providing an indication of a group index of elevation beams and an offset in the group index;
means for receiving second reference signals transmitted, using the preferred elevation beam and a plurality of azimuthal ports; and
means for providing a second stage channel feedback to the base station, based on the second reference signals.

15. The apparatus of claim 14, wherein the channel feedback comprises at least one of a channel quality indicator (CQI) and a precoding matrix indicator (PMI).

16. The apparatus of claim 15, wherein the PMI comprises an azimuthal PMI of the preferred elevation beam.

17. The apparatus of claim 14, wherein the elevation beams are formed by mapping antenna ports in an elevation dimension to a number of virtual beams.

18. The apparatus of claim 17, wherein each elevation beam is generated as an aggregation of entries of an elevation precoding vector.

19. The apparatus of claim 14, wherein the UE feeds back at least two preferred elevation beams.

20. The apparatus of claim 19, wherein the UE feeds back at least two preferred elevation beams when elevation angular spread is above a threshold value as determined based on the first reference signals.

21. The apparatus of claim 19, wherein the second reference signals comprise UE-specific channel state information reference signal (CSI-RS) resources for each preferred elevation beam.

22. The apparatus of claim 14, wherein:
the first reference signals are transmitted using common channel state information reference signal (CSI-RS) resources;
the second reference signals are transmitted using UE-specific CSI-RS resources; and the second stage channel feedback is based on a measurement of at least two of the UE-specific CSI-RS resources.

23. The apparatus of claim 14, wherein the plurality of elevation beams comprise a plurality of fixed elevation beams, with each fixed elevation beam mapped to a particular channel state information reference signal (CSI-RS) resource.

24. The apparatus of claim 23, further comprising receiving signaling indicating information regarding the mapping.

25. The apparatus of claim 14, wherein feedback regarding a group is provided less frequently than feedback regarding the offset.

26. The apparatus of claim 14, further comprising:
providing to the base station an indication of at least one non-preferred interfering elevation beam or group index of elevation beams.

27. An apparatus for wireless communications by a user equipment (UE), comprising:
at least one processor configured to:
receive first reference signals transmitted, using a plurality of elevation beams, from a base station having a multi-dimensional array of transmit antennas;
select, based on the first reference signals, at least one preferred elevation beam from the plurality of elevation beams;
provide to the base station an indication of the at least one preferred elevation beam, wherein providing to the base station an indication of at least one preferred elevation beam comprises providing an indication of a group index of elevation beams and an offset in the group index;
receive second reference signals transmitted, using the preferred elevation beam and a plurality of azimuthal ports; and
providing a second stage channel feedback to the base station, based on the second reference signals; and
memory coupled with the at least one processor.

28. A non-transitory computer-readable medium having instructions stored thereon, the instructions executable by one or more processors of a user equipment (UE) for:
receiving first reference signals transmitted, using a plurality of elevation beams, from a base station having a multi-dimensional array of transmit antennas;
selecting, based on the first reference signals, at least one preferred elevation beam from the plurality of elevation beams;
providing to the base station an indication of the at least one preferred elevation beam, wherein providing to the base station an indication of at least one preferred elevation beam comprises providing an indication of a group index of elevation beams and an offset in the group index;
receiving second reference signals transmitted, using the preferred elevation beam and a plurality of azimuthal ports; and
providing a second stage channel feedback to the base station, based on the second reference signals.

* * * * *